United States Patent [19]
Luhdorff et al.

[11] 3,920,280
[45] Nov. 18, 1975

[54] ANTISKID BRAKE CONTROL SYSTEM HAVING MALFUNCTION PROTECTION

[75] Inventors: Dieter Lühdorff, Hannover; Lutz Weise, Misburg; Erich Reinecke, Beinhorn; Alfred Klatt, Ronnenberg, all of Germany

[73] Assignee: WABCO Westinghouse GmbH, Hannover, Germany

[22] Filed: May 23, 1974

[21] Appl. No.: 472,609

[30] Foreign Application Priority Data
Aug. 10, 1973 Germany............................ 2340575

[52] U.S. Cl. .......... 303/21 AF; 340/62; 303/21 BE; 188/181 C
[51] Int. Cl.² .......................................... B60T 8/10
[58] Field of Search .............. 188/181; 235/153 AE; 303/20, 21; 307/10 R, 204, 219; 317/5; 324/161–162; 340/52 B, 53, 62, 146.1 BE, 262, 263

[56] References Cited
UNITED STATES PATENTS

| | | |
|---|---|---|
| 3,535,004 | 10/1970 | Howard et al. .................. 303/21 EB |
| 3,583,773 | 6/1971 | Steinbrenner et al. ......... 303/21 EB |
| 3,658,389 | 4/1972 | Okamoto et al. .............. 303/21 CG |
| 3,832,008 | 8/1974 | Leiber et al. ............... 303/21 EB X |

*Primary Examiner*—Trygve M. Blix
*Assistant Examiner*—Stephen G. Kunin
*Attorney, Agent, or Firm*—R. W. McIntire, Jr.

[57] ABSTRACT

A vehicle antiskid brake control system in which a skid control signal for modulating brake pressure at any one of the wheels is obtained when a disparity results from the comparison of a wheel velocity signal with a reference velocity signal formed by one or more of the wheel velocity signals so as to approximate the vehicle speed. The system includes an additional wheel velocity signal generator network in parallel with the conventional signal generator network at one or more wheels together with low and high signal selectors arranged so that a false wheel velocity signal arising from one of the signal generator networks due to a malfunction is rejected, thereby assuring that only the accurate wheel velocity signal from the other signal generator network is capable of influencing formation of the reference signal.

9 Claims, 1 Drawing Figure

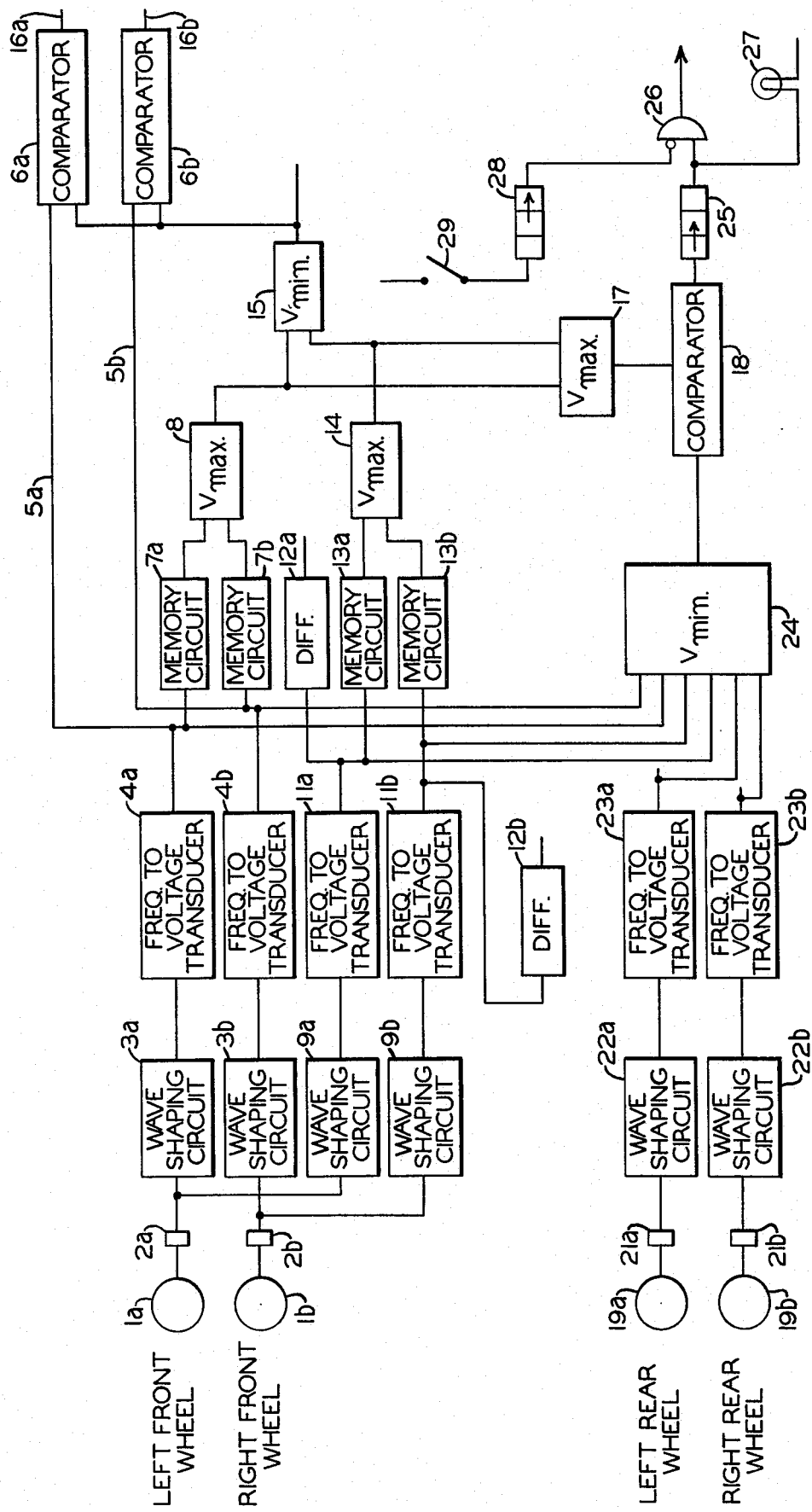

ANTISKID BRAKE CONTROL SYSTEM HAVING MALFUNCTION PROTECTION

BACKGROUND OF THE INVENTION

The present invention is concerned with a vehicle antiskid brake control system of the type in which individual wheel velocity signals are compared with a velocity reference signal that approximates the actual vehicle velocity, thereby obtaining an indication of a wheel skid when a discrepancy arises between the compared signals.

In forming the velocity reference signal, systems of the above type feed one or several of the wheel velocity signals, preferably those of the wheels of a non-driven axle, to special memory circuits which instantaneously reproduce increases and decreases of the individual wheel velocities within predetermined limits. In the instance of an abnormally high rate of wheel deceleration exceeding a predetermined skid threshold, the memory circuit provides only a gradual decay of the voltage level present immediately prior to such high rate of wheel deceleration, when only one wheel is utilized in the formation of the velocity reference signal. Where the velocity reference signal is formed from the velocity signals of both wheels, it is well known that the larger of the output signals from the special memory circuits can be selected as the reference signal prior to such time as the larger output signal falls below the skid threshold, at which time the memory circuits establish the previously mentioned gradual decay of the reference signal effective at that time.

By comparing the velocity signal derived from each wheel with the velocity reference signal formed, as above, a control signal used in the modulation of the brake pressure of a particular wheel can be obtained when that wheel velocity exceeds the velocity reference signal approximating the vehicle velocity.

Deceleration signals can also be obtained, by differentiating the wheel velocity signals, for use in also controlling modulation of a particular wheel brake pressure.

It has been found that in the event of a malfunction of the electronic circuitry of any one wheel employed in forming the velocity signal to the extent that an increased wheel velocity voltage occurs, the velocity reference signal formed therefrom tends to also increase in value and thus forms a false reference signal. Accordingly, the comparison of the other wheel velocities with this false reference velocity formed by the above-mentioned malfunction results in the antiskid system being provided an inaccurate control signal that produces unintentional modulation of the other wheel brake pressure and consequent undesirable lengthening of the vehicle stopping distance.

In order to overcome this disadvantageous and obviously unsafe situation, attempts have been made to include safety circuits of cutting-out the antiskid control system upon the occurrence of a malfunction within the electronic circuitry forming the velocity reference signal. Experience has proven, however, that such a solution is only conditionally feasible, since the sudden activation of the operator controlled foot pressure when cutting-out the antiskid control, particularly in the case of a panic brake application, can have an unfavorable effect upon the handling stability of such vehicles as trucks, trailers, semi-trailers and other commercial type vehicles. While solving the problem of excessive stop distances, the above solution may be even more dangerous in that uncontrolled vehicle swerving and jackknifing result.

One object of the invention, therefore, is to provide an antiskid brake control system that assures substantially normal stop distances of a vehicle in the event a malfunction causes an error to arise in the wheel velocity signal of one of the wheels involved in the formation of the velocity reference signal to which each wheel velocity signal is compared.

It is another object of the invention to cut out the antiskid brake control when a malfunction arises in the wheel velocity signal generator circuitry of one of the wheels only provided there is no brake application in effect at the time.

In accomplishing these objectives, the present invention provides redundant wheel velocity signal generator circuits for each wheel involved in the formation of the velocity reference signal approximating the vehicle speed. A low voltage signal selector unit chooses the lower of the two reference velocity signals obtained from each wheel as the true reference velocity signal. Thus, a malfunction of the velocity signal generator circuitry of one of the wheels that causes the velocity signal to rise abnormally is prevented from entering into the formation of the reference velocity signal so that when compared therewith, the reference velocity signal lies below the wheel velocity signal to prevent modulation of that wheel brake pressure by the antiskid control.

If the error due to a malfunction is in the sense of an abnormally low wheel velocity signal, a maximum voltage selector unit ahead of the low signal selector network cancels the low wheel velocity signal insofar as its use in forming the reference velocity signal is concerned. In this instance the reference velocity signal lies above the velocity signal of the wheel whose signal generator circuitry is malfunctioning so that modulation of that wheel brake pressure does occur. However, the remaining wheels are still accurately controlled by the antiskid control system in the instance of either an abnormally high or low error signal resulting from a malfunction so that extended stopping distances are prevented.

Another low voltage selector unit chooses the lower of each wheel velocity signal for comparison with the higher wheel velocity signal chosen by another high voltage selector unit in order to provide an error signal any time one or more of the wheel velocities differs from the others. This error signal acts through a delay circuit to actuate a warning indicator and to provide an output at an AND gate when the AND gate is enabled by the absence of a brake application. The AND gate output cuts out the antiskid control, while the warning indicator apprises the vehicle operator that a malfunction exists in the electronic circuitry comprising the antiskid control system.

Other objects and advantages will be realized from the following more detailed description when taken in accordance with the accompanying single FIGURE drawing showing a block diagrammatic representing the invention.

DESCRIPTION AND OPERATION

With reference to the drawing, explanation of the invention will now proceed without detailed discussion of well-known devices, accessory switches and wiring not necessary for a clear understanding of the invention.

The non-driven front wheels 1a, 1b of a road vehicle, for example, are each provided with respective rotation impulses sensors 2a, 2b, which generate impulses having a pulse frequency proportional to the rotational velocity of the wheel being monitored. These impulses are fed to a series-connected, signal generator network consisting of a wave shaping circuit 3a, 3b for converting a sine wave impulse to a square wave, and a frequency to voltage transducer 4a, 4b from which d.c. voltages are produced that are proportional in magnitude to the frequency of the square wave impulses and consequently to the wheel rotational velocity.

The voltages emitted by transducer 4a of the left front wheel 1a and the voltage emitted by transducer 4b of the right front wheel 1b are transmitted via wires 5a and 5b, respectively, to a comparator 6a and 6b, respectively, and to special memory circuits 7a and 7b, respectively. These comparators 6a and 6b only emit an output signal when the wheel velocity signal transmitted via wires 5a and 5b lies below a threshold determined by the final reference velocity signal. The memory circuits are designed such that their output voltage is capable of varying instantaneously in proportion to normal changes in the wheel velocity. On the other hand, abnormally rapid decreases in wheel velocity in excess of a predetermined skid threshold produce a gradual decay in the output voltage of memory circuits 7a and 7b present just prior to the rapid decrease in wheel velocity. These output signal voltages of memory circuits 7a and 7b are fed to a high voltage selector unit 8, which operate to produce a voltage at their outputs corresponding to the higher of the two input voltages fed thereto. Due to the gradual decay of the memory circuit outputs to abnormally fast wheel decelerations, the signal provided by voltage selector 8 will be assured of not reflecting a wheel skid condition and may therefore be considered as approximating the actual vehicle velocity throughout the different stages of wheel rotation.

Two additional signal generator networks of similar design consisting of of wave shaping circuits 9a, 9b and voltage transducers 11a, 11b are installed in parallel with the aforementioned signals generator networks so as to respond to the signal pulses emitted by impulse sensors 2a and 2b. These additional signal generator networks available for each front wheel 1a and 1b are thus redundant networks, the purpose of which is hereinafter explained.

The output voltages produced by these redundant signal generator networks are connected in parallel to respective differentiator circuits 12a and 12b, which provide deceleration slip control signals when a predetermined rate of deceleration occurs and to respective memory circuits 13a and 13b, which are similar in design and manner of operation to memory circuits 7a and 7b. In that the deceleration signals are emitted by signal generator circuits other than those emitting the individual wheel velocity signal to comparators 6a and 6b, either the deceleration signal or velocity signal will provide accurate wheel skid control in the event a malfunction renders the other inaccurate. The output voltages of memory circuits 13a, 13b are each fed to a high voltage selector unit 14 similar to selector unit 8 in order to obtain at the output of selector unit 14 a redundant voltage that also approximates the actual vehicle speed.

The two similarly generated voltages emitted by selector units 8 and 14 are connected to a low voltage selector unit 15, which chooses the lower of the two voltages as its output voltage. This output voltage of selector unit 15 represents the final reference velocity signal approximating the vehicle speed and is connected to comparators 6a and 6b for comparison with the respective wheel velocity voltages produced by the signal generator networks of the respective wheels 1a and 1b. It is to be understood at this point that only the comparators of the front wheels are shown to avoid confusion, but that similar comparators would be provided for each wheel in actual practice to compare the actual wheel velocity signal of each wheel with the final reference velocity signal generated. By comparing each wheel velocity with the approximated vehicle velocity through such comparison, any one of the vehicle wheels may provide a wheel skid control signal capable of influencing modulation of the wheel brake pressure. The respective comparators 6a and 6b emit this skid control signal via wires 16a and 16b to the wheel skid logic control system (not shown) when the wheel velocity signal becomes a predetermined amount less than the final reference velocity signal generated.

The two voltages provided at voltage selector units 8 and 14 are also transmitted to a high voltage selector unit 17, which chooses the larger of the two and connects that signal to one input of comparator 18.

The two rear wheels 19a and 19b are also provided with rotation impulses sensors 21a and 21b that are connected in series with signal generator networks comprising wave shaping circuits 22a and 22b and frequency to voltage transducers 23a, 23b similar to the signal generator networks of the front wheels 1a, 1b. The voltage signals emitted by transducers 23a and 23b are proportional to the wheel velocities of the respective rear wheels 19a and 19b and are connected on one hand to comparison circuits (not shown but similar to that of the front wheels to produce a control signal corresponding to the control signal at wires 16a and 16b) and on the other hand to a low voltage selector unit 24 to which the voltage signal of the four generator networks associated with the front wheels are also connected. The output of selector unit 24 represents the lowest one of the wheel velocity signals and is connected to the other input of comparator 18, which in turn emits an error signal when a predetermined difference occurs between its two input voltages.

A slow response timer 25 receives this error signal and after a predetermined delay provides an output signal that is connected to one input of an AND gate 26 and to an optical warning indicator 27, which may be suitably located for viewing by the vehicle operator.

AND gate 26 is provided with a negated input to which the output of a timer 28 is connected. Energizing current is connected to timer 28 via a brake pressure switch 29, when brake pressure is present. Thus, AND gate 26 can only be enabled upon expiration of a predetermined time period following release of a brake application to produce a cut-off signal to suppress operation of the antiskid brake control function in response to an error signal at comparator 18.

In operation, let it be assumed that a malfunction occurs in the signal generator network of the left front wheel 1a of a moving vehicle whose brakes are released. Such malfunction is further assumed to result in the output voltage of transducer 4a exceeding a value, which in the absence of such malfunction would be some selected proportion of the velocity of wheel 1a. This inaccurate, over-voltage signal resulting from the left front wheel velocity is connected to selector unit 8 via memory circuit 7a, while concurrently the velocity signal derived from the right front wheel 1b is also connected via memory circuit 7a to selector unit 8. Since the signal generator network of the right wheel 1b is functioning properly, the signal supplied to selector unit 8 via memory circuit 7b is an accurate signal of the right wheel velocity. The different magnitude output voltages of memory circuits 7a and 7b are thus monitored by high signal selector unit 8, which chooses the higher of the two voltages as a false reference velocity signal.

Concurrently, the redundant signal generator networks comprising circuit elements 9a, 11a and 9b, 11b further produce voltage signals proportional to the actual velocities of the left and right wheels 1a and 1b, since these redundant signal generator networks are assumed to functioning normally. As in the case of the signal generator networks comprising circuit elements 3a, 4a and 3b, 4b, the output signals of these redundant signal generator circuits are connected via memory circuits 13a and 13b to high voltage selector unit 14, which choose the larger of the two voltages as the true reference velocity signal. The false reference signal chosen by selector unit 8 and the true reference signal chosen by selector unit 14 are fed to high voltages selector unit 17, which in turn selects the higher or false reference velocity signal as one input to comparator 18. Low voltage selector unit 24, on the other hand, chooses the lower wheel velocity signal of the front and rear wheels 1a, 1b 19a and 19b as the second input of comparator 18. Since the output of selector unit 17 is higher than the output of selector 24, due to the overvoltage malfunction of the front left wheel signal generator network, an error signal is emitted by comparator 18 indicative of such malfunction. After the delay period provided by timer 25 expires, this error signal activates indicator 27 to provide the operator with knowledge of such malfunction and at the same time acts on AND gate 26.

In the assumed condition of a brake release, there is also a logical "O" signal present at the negated input of AND gate 26, enabling AND gate 26 to emit a cut-off signal at its output for the purpose of suppressing operation of the antiskid function of the vehicle brake system. Since indicator 27 has apprised the operator that the vehicle antiskid control has been rendered inoperative, the operator will now take particular care in exercising further brake control of the vehicle.

Had the aforementioned assumed malfunction of the signal generator network occurred during a brake application or prior to expiration of the time period provided by timer 28 following release of the brake application, AND gate 26 would be disabled to prevent the antiskid control function from being rendered inoperative until after the time period has elapsed. This will accure that the operation is not burdened by the responsibility of having to adjust his braking of the vehicle during the time an actual brake application is in effect, should a malfunction occur at that time.

Returning now to the so-called false and true reference signals provided by selector units 8 and 14, the actual reference velocity signal is determined by low signal selector unit 15, which chooses the lower of the two signals as the final reference velocity signal to which each of the individual wheel velocity signals are compared, as by comparators 6a and 6b of the front wheels 1a and 1b. Although not shown, the velocity signals of the rear wheels 19a and 19b would similarly be compared to the final reference velocity signal.

Now since the assumed malfunction of the signal generator network of front wheel 1a has, as previously mentioned, produced an abnormally high voltage that is greater than the final velocity reference signal at comparator 6a, there will be no velocity control signal emitted at output 16a so that during a brake application, modulation of the left front wheel brake pressure in accordance with the antiskid brake control system is withheld. Braking effective at the left front wheel 1a therefore remains in effect at the pressure supplied according to the operator's control of his foot valve device, while the other three wheels of the vehicle, i.e., the front right wheel 1b, the rear left wheel 19a and the rear right wheel 19b are individually controlled under the influence of the vehicle antiskid control. It is apparent therefore that all four vehicle wheels contribute to the braking and the vehicle stop distance may be only slightly extended due to the absence of any influence upon the left wheel by the antiskid control system, should a wheel skid condition arise.

Now let it be assumed that a malfunction exists within the signal generator network of wheel 1a such that instead of a voltage rise, as before, a voltage drop to near zero actually occurs. In this case, both signal selector units 8 and 14 produce output voltages of greater value (even in the instance of a wheel skid at one of the wheels 1b, 19a or 19b) than the error voltage resulting from the malfunction assumed relative to signal generator network of wheel 1a, to in effect eliminate the under-voltage signal in forming the final reference velocity signal. The lower of these selector unit outputs is provided at the output of signal selector 15, as the final reference velocity signal, while concurrently selector unit 17 connects the higher of the mentioned outputs from selector units 8 and 14 to comparator 18. Since selector 24 transmits the lower of the several wheel velocity signals, the near zero voltage from the signal generator network of wheel 1a, in this assumed instance, causes comparator 18 to emit an error signal indicative of the malfunctioning generator network. This error signal acts, as previously described, to prevent cutting out the vehicle antiskid control function should be malfunction arise at the time a brake application is already in effect.

Assuming a brake application is made following occurrence of the signal generator malfunction, each comparator 6a, 6b etc. of the several wheels receives the vehicle final reference velocity signal, as well as their individual wheel velocity signals for detecting a wheel skid condition. Since the near zero wheel velocity signal emitted by the malfunctioning signal generator network of wheel 1a lies well below the reference velocity signal generated, comparator 6a emits a signal at output 16a, which acts to release brake pressure at wheel 1a until the malfunction is corrected.

The other three wheels 1b, 19a and 19b continue to be braked subject to regulation by the wheel antiskid control. Thus, only one wheel is affected by the malfunction according to this second assumed instance, as well as in the first assumed instance, so that again the vehicle can be safely braked to a stop without experiencing an excessively extended stopping distance.

Furthermore, the timer 28 prevents the sudden and dangerous cutting out of the malfunctioning antiskid control system such as when a pumping action of the brakes is required in descending long grades.

Having now described the invention, what we claim as new and desire to secure by Letters Patent is:

1. A vehicle antiskid brake control system comprising:
   a. first means for providing wheel velocity signals according to the speeds of rotation of the individual wheels of the vehicle;
   b. means for forming a reference velocity signal from a wheel velocity signal of at least one wheel of the vehicle as an approximation of the vehicle speed;
   c. means for comparing said wheel velocity signals of the individual wheels with said reference velocity signal to obtain a wheel skid control signal when differences therebetween occur so as to effect modulation of brake pressure at whichever wheel is providing said wheel velocity signal different than said reference velocity signal; wherein the improvement comprises:
   d. second means in parallel with said first means for providing additional wheel velocity signals according to the speeds of rotation of the individual wheels of the vehicle in addition to said first mentioned wheel velocity signals thereof and
   e. said means for forming a reference velocity signal including third means for selecting the lower one of said additional and said first mentioned velocity signals of said at least two wheels for use in forming said reference velocity signal.

2. An antiskid brake control system as recited in claim 1, further comprising:
   a. fourth means for selecting the higher of said first mentioned wheel velocity signals corresponding to the speed of rotation of at least two individual wheels; and
   b. fifth means for selecting the higher of said additional wheel velocity signals of said at least two wheels, whereby said lower one of said first mentioned wheel velocity signals and said additional wheel velocity signals selected by said third means for use in forming said reference velocity signal is the higher of said first mentioned wheel velocity signals and said additional wheel velocity signals of said at least two wheels.

3. An antiskid brake control system as recited in claim 2, further comprising:
   a. sixth means for selecting a first output signal according to the higher of said wheel velocity signals selected by said fourth and said fifth means;
   b. seventh means for selecting a second output signal according to the lower of said wheel velocity signals of at least said two wheels;
   c. means for comparing said first and second output signals to provide an error signal when said first and second output signals differ; and
   d. means responsive to said error signal for interrupting operation of the antiskid brake control system except when a brake application is already in effect at the time said error signal arises.

4. An antiskid brake control system as recited in claim 3, wherein said means for interrupting operating of the antiskid brake control system comprises an AND gate having one input subject to said error signal, a negated input subject to a brake pressure signal and an output providing an antiskid control cut-out signal only when said AND gate is enabled by the absence of said brake pressure signal at the time said error signal arises.

5. An antiskid brake control system as recited in claim 4, further comprising means for delaying reception of said error signal at said one input of said AND gate.

6. An antiskid brake control system as recited in claim 4, further comprising means operatively responsive to the presence of said error signal for indicating a wheel skid condition.

7. An antiskid brake control system as recited in claim 4, further comprising means for sustaining said brake pressure signal a predetermined duration following release of a brake application.

8. An antiskid brake control system, as recited in claim 1, further comprising differentiator means subject to said additional wheel velocity signal for providing a deceleration signal to effect modulation of brake pressure at an individual wheel whose rate of deceleration exceeds a certain chosen value.

9. An antiskid brake control system as recited in claim 1, further comprising memory means for modifying said wheel velocity signals such that said reference velocity signal approximates the vehicle speed during such time as said wheel velocity signals reflect a wheel whose rate of deceleration exceeds a certain chosen value.

* * * * *

UNITED STATES PATENT AND TRADEMARK OFFICE
CERTIFICATE OF CORRECTION

PATENT NO. : 3,920,280
DATED : November 18, 1975
INVENTOR(S) : Dieter Luhdorff, Lutz Weise, Erich Reinecke & Alfred Klatt It is certified that error appears in the above–identified patent and that said Letters Patent are hereby corrected as shown below:

Column 7, line 27, before "velocity" insert --wheel--

Column 8, line 15, change "operating" to --operation--

Signed and Sealed this

Eleventh Day of January 1977

[SEAL]

Attest:

RUTH C. MASON
*Attesting Officer*

C. MARSHALL DANN
*Commissioner of Patents and Trademarks*